Jan. 2, 1945. C. DEL VECCHIO 2,366,318
ELECTRIC HEATER FOR STEAM FURNACES
Filed Nov. 14, 1942 2 Sheets-Sheet 1
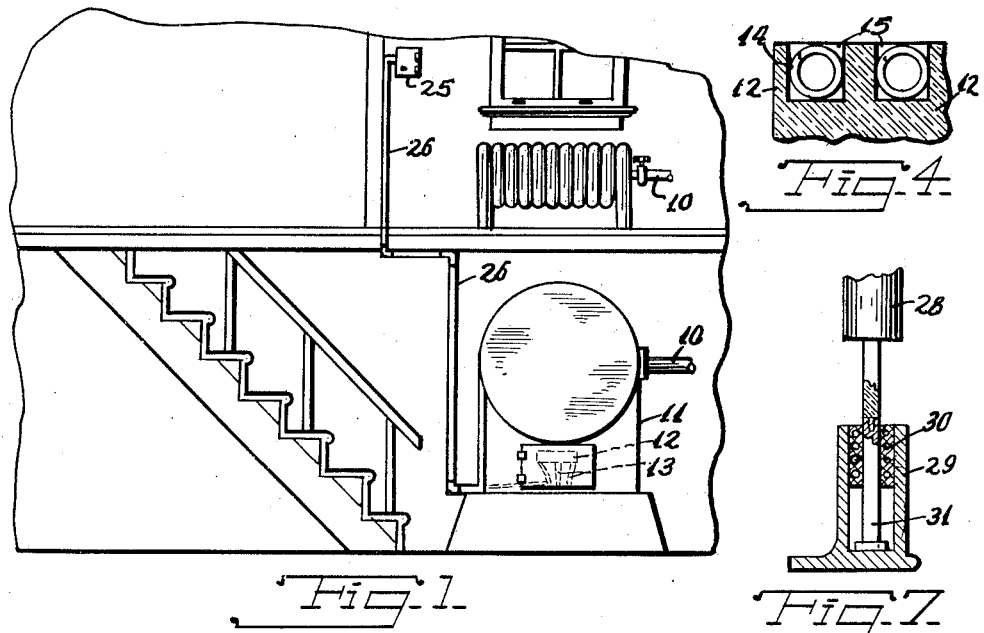
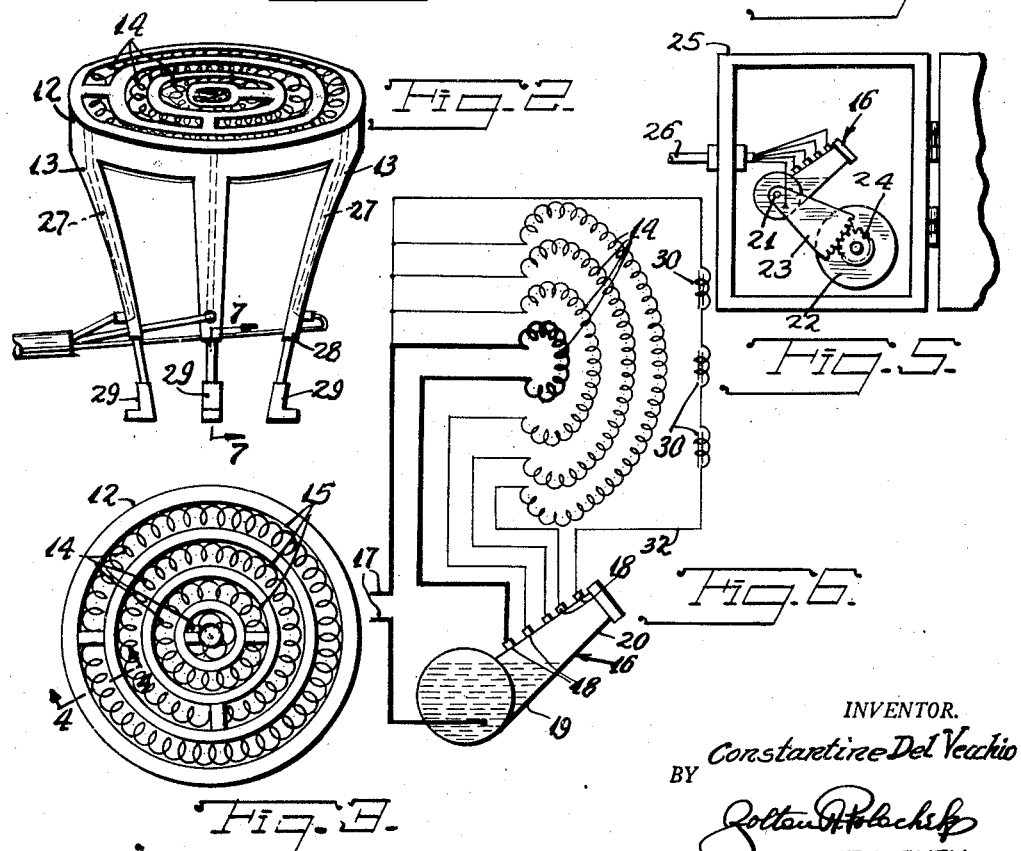
INVENTOR.
Constantine Del Vecchio
BY
ATTORNEY Jan. 2, 1945.   C. DEL VECCHIO   2,366,318
ELECTRIC HEATER FOR STEAM FURNACES
Filed Nov. 14, 1942   2 Sheets-Sheet 2
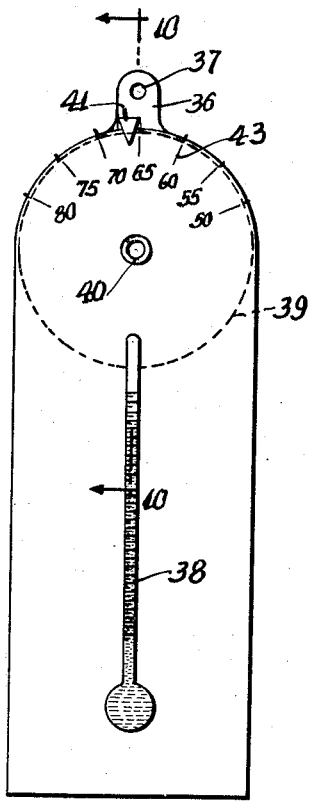
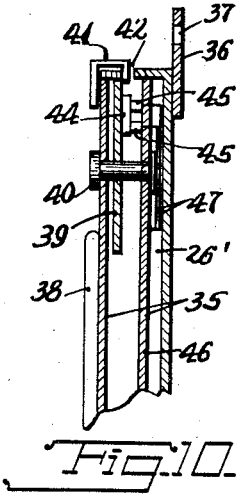
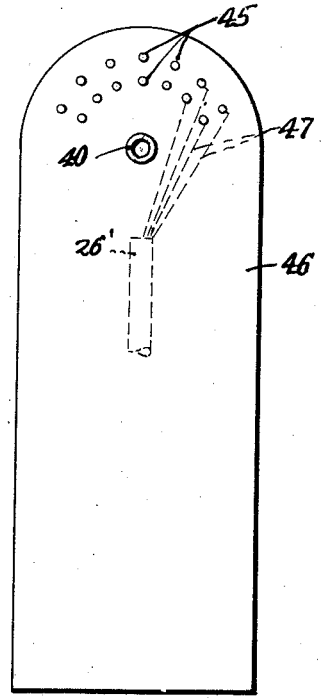
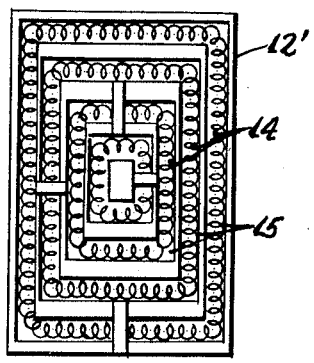
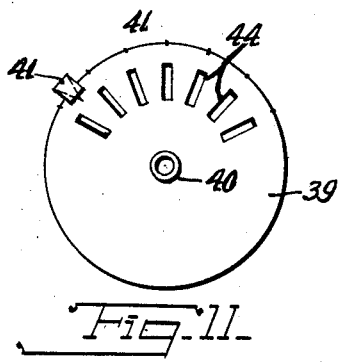
INVENTOR.
BY *Constantine Del Vecchio*
*Zoltan Holecheck*
ATTORNEY Patented Jan. 2, 1945

2,366,318

UNITED STATES PATENT OFFICE 2,366,318

ELECTRIC HEATER FOR STEAM FURNACES

Constantine Del Vecchio, Brooklyn, N. Y.

Application November 14, 1942, Serial No. 465,529

4 Claims. (Cl. 219—38)

This invention relates to new and useful improvements in an electric heater for steam furnaces.

More particularly, the invention proposes an electric heater which may be used for steam generating furnaces and which may take the place of fuel oil heating burners, as fuel oils are now becoming scarce.

More specifically, the invention proposes to characterize the new electric heater by a plurality of heater electric windings mounted on a body adapted to be mounted in the furnace, and an electric circuit including a multi-pole switch for progressively connecting said windings to increase the heat when desired, and progressively disconnecting them for lowering the degree of heat.

Several forms of the invention are proposed. In one form a standard thermostatic control is provided for operating the multi-pole switch. In another form it is proposed that this switch be manually operated. In this latter form an arrangement is proposed by which the switch may be easily operated, and it is also contemplated to provide a thermometer adjacent the switch to indicate room temperatures so that a person may correctly work the switch.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a sectional view of a house provided with a steam furnace and steam heating system and equipped with an electric heater in accordance with this invention.

Fig. 2 is an enlarged perspective view of the electric heater shown in Fig. 1.

Fig. 3 is a plan view of Fig. 2.

Fig. 4 is a fragmentary enlarged sectional view taken on the line 4—4 of Fig. 3.

Fig. 5 is a fragmentary elevational view of the thermostatic switch used in this device.

Fig. 6 is a schematic wiring diagram of the device.

Fig. 7 is a fragmentary sectional view of one of the supporting members of the heater body, this view being taken on the line 7—7 of Fig. 2.

Fig. 8 is a plan view of an electric heater constructed in accordance with a modified form of this invention.

Fig. 9 is an elevational view of a modified form of switch for the electric heater.

Fig. 10 is a fragmentary sectional view taken on the line 10—10 of Fig. 9.

Fig. 11 is a rear elevational view of the control disc of the switch shown in Figs. 9 and 10.

Fig. 12 is a front elevational view of the contact support shown in Fig. 10.

The electric heater for steam boilers, in accordance with this invention, is used in combination with a steam heating system 10 having a furnace 11. An electric heater body 12 with supporting members 13 is mounted within said furnace 11. A plurality of heating windings 14 are mounted on the body 13. These heating windings are arranged in circular forms. The body 12 is constructed of insulation material and is formed with grooves 15 along which the windings 14 extend.

There is a multi-pole switch 16 for progressively connecting the windings 14 in an electric circuit 17. The switch 16 is provided with a plurality of poles 18 to which the windings 14 are connected. These windings are connected in a parallel group connected in series with the circuit 17. The switch 16 is of the mercury type. It comprises a vessel 19 supporting the mercury. This vessel has a tangentially upwardly and laterally directed neck portion 20 along which the contacts or poles 18 are mounted. The vessel 19 is pivotally supported on a spindle 21. A thermostat 22 is connected with the switch 16 for automatically operating the switch in accordance with the temperature of the house. The spindle 21 is provided with a segment gear 23 which connects with a pinion 24 connected with and controlled by the thermostat 22. The switch 16 and thermostat 22 are located within a control box 25 which is mounted on the wall of the house. This control box is connected by the cable 26 with the circuit 17 which includes the windings 14. While the windings 14 are mounted on the body 12 they are connected by leads 27 to form the cable 26.

The supporting members 13 of the heater body 12 comprise legs consisting of expandable sections 28 and 29. Solenoids 30 are mounted on one of these sections and have cores 31 connected with the other of these sections. These solenoids 30 are connected in a series group 32 which is connected in parallel with the windings 14. This series group is connected with the outermost pole 18 of the multi-switch 16. The leg sections 29 rest on a support within the furnace 11. Gravity is depended upon to maintain the leg sections 28 in their lowered positions. When the solenoids 30 are energized the leg sections 28 will move upwards to raise the heater body 12 and move said heater body and its windings closer to the boiler of the furnace.

In Fig. 8 a modified form of the invention is disclosed in which the heater body 12' is of oblong shape and the heater windings 14 are mounted upon this body in bands resembling oblongs. In other respects this form of the invention is identical to the previous form and like parts are identified by like reference numerals.

In Figs. 9 to 12 a modified form of multi-pole switch for controlling the heater has been disclosed. This multi-pole switch includes a casing 35 provided with a lug 36 having an opening 37 by which the casing may be conveniently hung upon a nail on a wall. A thermometer 38 is mounted on the outside of the casing 35. The top of the casing 35 is half round. A control disc 39 is located within the top of the casing 35 and is turnable supported by a rivet 40 mounted on the front wall of the casing 35. This control disc 39 has a projecting pointer 41 which extends out of a slot 42 in the top of the casing 35. This pointer 42 works over a scale 43 imprinted along the top half rounded portion of the casing 35. A plurality of radially extending electric contacts 44 are mounted on the back face of the control disc 39. These contacts are adapted to selectively bridge radially spaced groups of contacts 45 mounted in an arcuate path upon the top portion of a contact support 46 located within the casing 35. This contact support 46 is held in a relatively stationary position by the rivet 40 which also engages through it. The spaced contacts 45 are connected with the wires 47 which form the cable 26' and which are connected with the heater windings of the electric heater.

Further details of the connection of this switch will not be given in this specification as it will be readily understood by those skilled in the art from the disclosure of the connection of the switch 16 in Fig. 6. However, it is pointed out that the pointer 41 may be moved over the scale 43 for causing the contacts 44 to bridge any number of the spaced contacts 45 for closing the parallel circuits through the heater windings 14. In this way any number of the heater windings may be placed into operation, or out of operation, when desired.

The operation of the device is as follows.

The thermostat 22 may be set to operate the switch 16 at preselected temperatures. Whenever the premises reaches these predetermined temperatures the switch 16 will function to connect or disconnect one or more of the windings 14 to supply more or less heat to the furnace 11. This will control the steam supplied to the steam heating system 10.

In the event that a manually controlled switch is used, such as disclosed in Figs. 9 to 12, it is merely necessary to manually move the pointer 41 for connecting or disconnecting the windings 14. In the event that all of the windings 14 are in operation and additional heat is required, the last pole 18 of the switch 16, or the corresponding pole in the manually operated switch, will close the circuit 32 for energizing the solenoids 30 which then function to move the windings 14 closer to the boiler of the furnace.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with a steam heating system having a furnace, an electric heater body with supporting members mounted in said furnace, a plurality of heater electric windings mounted on said body, a multi-pole switch for progressively connecting said windings in an electric circuit, and an electric circuit for said windings and switch, said supporting members comprising legs consisting of expandable sections, solenoids for expanding said sections and being connected in said circuit and controlled by said switch for moving said heater windings closer to said furnace.

2. In combination with a steam heating system having a furnace, an electric heater body with supporting members mounted in said furnace, a plurality of heater electric windings mounted on said body, a multi-pole switch for progressively connecting said windings in an electric circuit, and an electric circuit for said windings and switch, said supporting members comprising legs consisting of expandable sections, solenoids for expanding said sections and being connected in said circuit and controlled by said switch for moving said heater windings closer to said furnace, said solenoid having cores connected with one of the leg sections and having their bodies mounted on the other of the leg sections.

3. In a combination with a steam heating system having a furnace enclosing a boiler, a flat electric heater body disposed within said furnace beneath said boiler, a plurality of electric heater windings mounted on the top face of said heater body, a multi-pole switch for progressively connecting said windings in an electric circuit, an electric circuit for said windings and switch, legs having expandable sections supporting said heater body, and means on said legs connected in said circuit to be controlled by said switch for expanding said legs to raise said heater body and bring said electric windings into closer proximity to said boiler.

4. In combination with a steam heating system having a furnace enclosing a boiler, a flat electric heater body disposed within said furnace beneath said boiler, a plurality of electric heater windings mounted on the top face of said heater body, a multi-pole switch for progressively connecting said windings in an electric circuit, an electric circuit for said windings and switch, legs having expandable sections supporting said heater body, and means on said legs connected in said circuit to be controlled by said switch for expanding said legs to raise said heater body and bring said electric windings into closer proximity to said boiler, comprising solenoids having coil bodies mounted on the bottommost sections of said legs and connected in said circuit and cores mounted on the topmost sections of said legs and engaging said coil bodies.

CONSTANTINE DEL VECCHIO.